Oct. 12, 1965  M. WALLSHEIN  3,210,818
CLAMPS
Filed Oct. 13, 1961

INVENTOR,
MELVIN WALLSHEIN
BY
ATTORNEY

United States Patent Office 3,210,818
Patented Oct. 12, 1965

3,210,818
CLAMPS
Melvin Wallshein, 8645 Bay Parkway, New York, N.Y.
Filed Oct. 13, 1961, Ser. No. 144,887
2 Claims. (Cl. 24—125)

The present invention relates to improvements in clamps to hold a wire which may be used for any purpose where it is desired to associate a clamp and a wire. As an example to explain this invention, I have chosen its adaptation in brackets to support an arch wire in the practice of orthodontia.

The principal object of this invention is to provide a novel and improved wire clamp comprising a threadedly engaged screw and nut construction offering a notch to receive the wire, so that upon tightening the hold on the wire in the notch, the action automatically locks said screw and nut against accidental loosening.

Another object thereof is to provide a novel and improved clamping device of the character described, which is simple in construction, reasonably cheap to manufacture, easy to use and efficient in carrying out the purposes for which it is designed.

Other objects and advantages will become apparent as this disclosure proceeds.

For one practice of this invention, it may be a structure comprising a nut threadedly engaged on a screw of a material having some resilient quality; said screw having a tapered notch to hold a wire therethrough. The direction of the notch is such that the nut in its travel along the screw towards notch apex, will press the wire further into the notch and thereby cause an increase in notch angle, whereupon the nut will become locked on the screw.

In the accompanying drawing forming part of this specification, similar characters of reference indicate corresponding parts in all the views.

Figure 1:
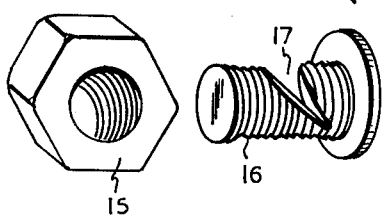
FIG. 1 is a perspective view showing the parts which constitute a preferred embodiment of the clamping means taught herein.
Figure 2:
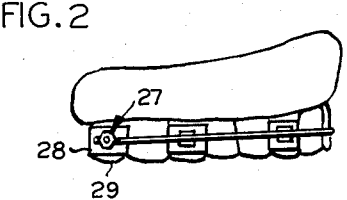
FIG. 2 is a side view of a patient's upper teeth in his mouth, equipped with an arch wire which is mounted on brackets and its end is shown anchored in a bracket employing the clamping means shown in FIG 1. This is given to show one use for clamps of this invention.
Figure 3:
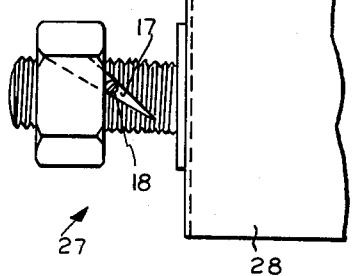
FIG. 3 is an enlarged fragmentary side view of said bracket which includes the clamping means.
Figure 5:
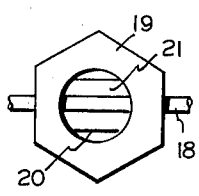
FIG. 5 is an end view of FIG. 4.

In the drawing, the numeral 15 designates a nut threadedly engaged on a screw 16 which between its ends has a V-notch 17 across it to hold a wire 18 therethrough. The numeral 19 designates a nut threadedly engaged on the screw 20 which across an end has a V-notch 21 for like purposes. The walls of these notches in each case are in non-perpendicular relation to screw axis and they converge towards that end of the screw to which the nut must travel in order to force the wire into the notch. It is evident that when the nut in each instance mentioned is made to travel along its associated screw from notch opening to notch bottom, the nut in intercepting the wire lying through the notch, will press the wire into the notch. The notches are preferably relatively deep and the screws are of a material having sufficient resilient quality that upon the pressing of the wire further into the notch by the nut, the angle of the notch will increase, and though such increment be tiny, the nut will become bound to its associated screw and be locked thereon against accidental loosening.

Figures 7, 8:
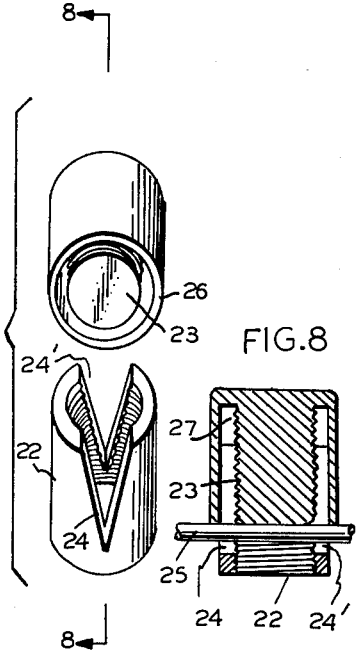
FIG. 7 is an exploded perspective view of the parts of a clamping means employing this invention, which is a further modification.
FIG. 8 is a section taken at line 8—8 in FIG. 7 showing the structure of FIG. 7 assembled and engaging a wire.
Figure 6:
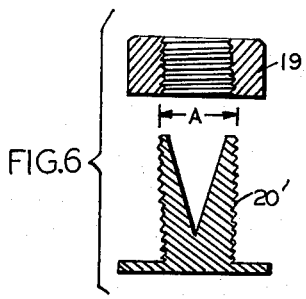
FIG. 6 is an exploded view showing the parts which constitute the clamp of FIG. 4, slightly modified.

Another form of clamp structure as shown in FIGS. 6 and 7, comprises a nut 22 which is an interiorly threaded tubular member threadedly engaged on the screw 23. Here, the nut has the aligned V-notches 24, 24' across a face thereof to receive a wire 25 therethrough, to be pressed further into said notches by the screw 23. This screw has a spaced apron thereabout which is integral with one end of the screw body, thereby providing the annular channel 27 for said nut 22 to enter in sliding fit therewith. When the parts 22 and 28 are relatively turned to tighten their hold on the wire 25, the angle of each of said notches 24, 24' will increase a bit thereby locking the nut 22 by its friction hold on the inner wall of said apron 26 on the screw member. Though there occurs a slight shift of the nut threads away from the screw 23, the nut and screw still remains threadedly engaged.

I have specifically illustrated the incorporation of the clamping device 27 as a bracket on a thin metal band 28 which is tightly fitted on the tooth 29, to serve as the anchorage for the end of the arch wire 18. This clamp bracket using any of the clamping constructions herein shown, may be used at any tooth where it is desired to have the arch wire fixed in relation to the tooth. It is also evident that any such clamping means may be mounted at any region of the arch wire without attachment to a tooth, as may be desired for attachment of orthodontic appurtenances, as are for instance used to effect intra or inter-maxillary connections.

Figure 4:
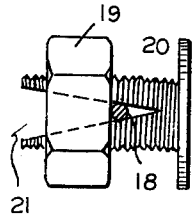
FIG. 4 is a longitudinal view of a modified form of clamping means embodying the teachings of this invention.

When the angle of the notch 21 is enlarged a bit so that distance "A" is slightly in excess of the root diameter of the nut 19, the tines need be brought together a bit to decrease the notch angle in order to mount the nut on the screw 20'. This can be done by pinching the tines with a plier having plastic faced jaws so as not to injure the threads and in some instances by hand. The nut 19 when mounted on the screw so that at least part of the nut shall be across the notch as in FIG. 4, said nut will be locked though there is no wire 18 in the assembly. It is evident that the screw will lock the nut.

As further example for the wide use of these clamping devices, they may be mounted on the panels of electrical apparatus to serve as the binding posts for the terminal connections thereto. To those versed in the art, such adaptation is readily understandable without further illustration.

This invention is capable of numerous forms and various applications without departing from the essential features herein disclosed. It is therefore intended and desired that the embodiments shown herein shall be deemed merely illustrative and not restrictive and that the patent shall cover all patentable novelty herein disclosed for reference is had to the following claims rather than the specific description herein to indicate the scope of this invention.

I claim:

1. In a clamping device of the character described, a screw member whose threads are normally of uniform diameter and a nut member whose threads are normally of uniform diameter; said nut member being threadedly engaged on said screw member and freely rotatable therealong without being locked thereto; said screw member having a V-notch thereacross to receive a wire therethrough; the depthwise direction into said notch being towards one end of the thread on the screw member; said screw member having some resilient quality whereby on turning one of said members relative to the other so that a wire positioned through the notch is intercepted by the nut member and then forced deeper into said notch, the angle of said notch is increased, the wire is clamped by said members and the nut member is locked on the screw member.

2. In a clamping device of the character described, a screw member and a nut member threadedly engaged thereon and freely rotatable thereon without being locked thereto; said screw member having a V-notch thereacross to receive a wire therethrough; the depthwise direction of said notch being towards one end of the screw member; said notch opening at the threaded portion intermediate the ends of the screw member; said screw member having some resilient quality whereby on turning one of said members relative to the other so that a wire positioned through the notch is intercepted by the nut member and then forced deeper into said notch, the angle of the notch is increased, the wire is clamped by said members and the nut member is locked on the screw member.

References Cited by the Examiner
UNITED STATES PATENTS

| | | | |
|---|---|---|---|
| 254,473 | 3/82 | Gates | 24—124 X |
| 270,705 | 1/83 | Tumey | 24—124 |
| 1,448,116 | 3/23 | Haislip | 339—272 X |
| 2,111,712 | 3/38 | Walde | 339—236 X |
| 2,206,295 | 7/40 | Ziemer | 339—244 |
| 2,844,808 | 7/58 | East | 339—244 |

FOREIGN PATENTS

| | | |
|---|---|---|
| 7,820 | 4/03 | Great Britain. |
| 288,813 | 4/28 | Great Britain. |
| 839,254 | 6/60 | Great Britain. |

DONLEY J. STOCKING, *Primary Examiner.*

ROBERT E. MORGAN, *Examiner.*